(12) United States Patent
Herle

(10) Patent No.: US 8,236,447 B2
(45) Date of Patent: Aug. 7, 2012

(54) ELECTRODE ACTIVE MATERIAL FOR NON-AQUEOUS SECONDARY BATTERIES

(75) Inventor: Subramanya Parampalli Herle, Mountian View, CA (US)

(73) Assignee: Panasonic Corporation, Osaka (JP)

( * ) Notice: Subject to any disclaimer, the term of this patent is extended or adjusted under 35 U.S.C. 154(b) by 61 days.

(21) Appl. No.: 12/515,192

(22) PCT Filed: Nov. 15, 2007

(86) PCT No.: PCT/US2007/023978
§ 371 (c)(1),
(2), (4) Date: Jan. 8, 2010

(87) PCT Pub. No.: WO2008/063532
PCT Pub. Date: May 29, 2008

(65) Prior Publication Data
US 2010/0112444 A1 May 6, 2010

Related U.S. Application Data

(60) Provisional application No. 60/859,669, filed on Nov. 17, 2006.

(51) Int. Cl.
*H01M 4/00* (2006.01)
*B05D 5/12* (2006.01)

(52) U.S. Cl. .................................. 429/221; 427/126.1
(58) Field of Classification Search .................. 429/209, 429/220, 223, 224, 226, 227, 231.3, 231.9, 429/221; 427/126.1
See application file for complete search history.

(56) References Cited

U.S. PATENT DOCUMENTS
7,160,648 B2 * 1/2007 Noh .............................. 429/307

FOREIGN PATENT DOCUMENTS
WO WO 03/058732 * 7/2003
* cited by examiner

*Primary Examiner* — Jennifer Michener
*Assistant Examiner* — Monique Wills
(74) *Attorney, Agent, or Firm* — RatnerPrestia

(57) ABSTRACT

An electrode for non-aqueous secondary batteries that is capable of intercalating and de-intercalating an alkali metal, such as lithium, and a non-aqueous secondary battery comprising the electrode are disclosed. The electrode comprises an electrode current collector, and, on the electrode current collector, an electrode active material. The electrode active material has the overall composition: $Si_aM_bP_c$; in which $0<a<1$, $0 \leqq b<1$, $0<c<1$, and $a+b+c=1$; and M is selected from the group consisting of Mn, Co, Ni, Sn, Fe, and mixtures thereof. Depending on the redox potential of the other electrode in the battery, the electrode may be either a positive electrode (cathode) or a negative electrode (anode).

22 Claims, 5 Drawing Sheets

ELECTRODE ACTIVE MATERIAL FOR NON-AQUEOUS SECONDARY BATTERIES

CROSS REFERENCE TO RELATED APPLICATIONS

This is a U.S. National Phase Application of PCT International Application No. PCT/US2007/023978, filed Nov. 15, 2007 (incorporated by reference herein in its entirety), and claims priority of U.S. Pat. No. 60/859,669, filed Nov. 17, 2006.

FIELD OF THE INVENTION

This invention relates to an electrode for a non-aqueous secondary battery, a non-aqueous secondary battery comprising the electrode, and to a process of producing the electrode. More particularly, the invention relates to an electrode that comprises an electrode active material that is capable of intercalating and de-intercalating an alkali metal, such as lithium.

BACKGROUND OF THE INVENTION

Cordless portable electronic devices, such as such as personal computers, cell phones, and personal digital assistants (PDA), as well as audio-visual electronic devices, such as video camcorders and mini-disc players, are rapidly becoming smaller and lighter in weight. Because these devises are designed to be light weight and compact, a demand for compact and light weight secondary batteries that have a higher energy density than that obtainable by conventional lead-acid batteries, nickel-cadmium storage batteries, or nickel-metal hydride storage batteries has developed.

Non-aqueous electrolyte secondary batteries have been extensively developed to meet this demand. Although lithium is the best candidate for the anode material (3860 mAh/g), repeated dissolution and deposition of lithium during discharging and charging cycles, causes the formation of dendritic lithium on the surface of the lithium. Dendrites decrease charge-discharge efficiency and can pierce the separator and contact the positive electrode, causing a short circuit and unacceptably shortening the life of the battery. In addition, the circuit density is high at the end of a dendrite, which can cause decomposition of the non-aqueous solvent.

To overcome these problems, carbon materials, such as graphite, capable of absorbing and desorbing lithium have been used as the negative electrode active material in lithium non-aqueous electrolyte secondary batteries. When a graphite material is used as the negative electrode active material, lithium is released at an average potential of about 0.2 V. Because this potential is low compared to non-graphite carbon, graphite carbon has been used in applications where high voltage and voltage flatness are desired. However, the search for alternate anode materials is continuing because the theoretical discharge capacity of graphite is only about 372 mAh/g. Thus, these batteries cannot meet the demand for high energy density required for many light weight mobile electrical and electronic devices.

Materials that are capable of absorbing and desorbing lithium and showing high capacity include simple substances such as silicon and tin. Elemental silicon and tin are high energy density materials, and they react with lithium at low voltage with respect to Li/Li$^+$. However, absorption of lithium by silicon or by tin causes the silicon or tin to expand. When the battery case has low strength, such as a prismatic case made of aluminum or iron, or an exterior component which is made of an aluminum foil having a resin film on each face thereof (i.e., an aluminum laminate sheet), the battery thickness increases due to expansion of the negative electrode, such that an instrument comprising the battery could be damaged. In a cylindrical battery using a battery case with high strength, because the separator between a positive electrode and a negative electrode is strongly compressed due to volume expansion of the negative electrode, an electrolyte-depleting region is created between the positive electrode and the negative electrode, thereby making the battery life even shorter. In addition, there is a risk of battery puncture, causing serious safety concerns.

To address these problems, silicon, tin, and silicon/tin composites, with or without carbon, have been proposed as alternate anode materials for lithium secondary batteries. For example, Miyaki, U.S. Pat. Publication 2005/0181276, relates to Co—Sn amorphous composites with carbon for nonaqueous electrolyte secondary batteries. Kawakami, U.S. Pat. Publication 2005/0175901, describes anode materials containing Sn-transition metals and alkali/alkaline earth/p-block element-alloys for non-aqueous secondary batteries. Yamamoto, U.S. Pat. Publication 2005/0084758, relates to carbon coated with Si/Sn anodes for lithium batteries.

However, these materials still have the disadvantage of volume expansion upon incorporation of lithium. They develop cracks and eventually fall off the current collector as the charge/discharge cycle is repeated. Because all the silicon-silicon or the tin-tin bonds are broken when an alloy with maximum lithium content is formed, it is desirable to have anode material having a larger free volume for Li$^+$-ions within the host structure without much change in the host structure when material absorbs lithium. It is also desirable to have inexpensive compound that is also non-polluting, to make the battery both inexpensive and environmentally benign.

SUMMARY OF THE INVENTION

In one aspect the invention is a non-aqueous electrolyte secondary battery that comprises a high energy density electrode active material that prolongs electrode life and is inexpensive and environmentally benign. The battery comprises:

a positive electrode;

a negative electrode; and a non-aqueous electrolyte between the positive electrode and the negative electrode;

in which one of the positive electrode and the negative electrode comprises a current collector, and, on the current collector, an electrode active material, in which the electrode active material has the overall composition:

$Si_aM_bP_c$;

in which:

$0<a<1$, $0\leq b<1$, $0<c<1$, and $a+b+c=1$; and

M is selected from the group consisting of Mn, Co, Ni, Sn, Fe, and mixtures thereof.

In another aspect, the invention is an electrode, such a negative electrode (anode), that comprises the electrode active material of the invention. In other aspects, the invention is an electrode in which lithium has been incorporated into the electrode active material, and a battery in which lithium has been incorporated into the electrode active material. In yet other aspects, the invention is a process for preparing the electrode and a process for preparing the battery.

DETAILED DESCRIPTION OF THE INVENTION

Unless the context indicates otherwise, in the specification and claims, the terms metal, binder, conductive material, electrode active material, negative electrode active material, positive electrode active material, lithium salt, non-aqueous solvent, additive, and similar terms also include mixtures of such materials. Unless otherwise specified, all percentages are percentages by weight and all temperatures are in degrees Centigrade (degrees Celsius).

Figure 1:
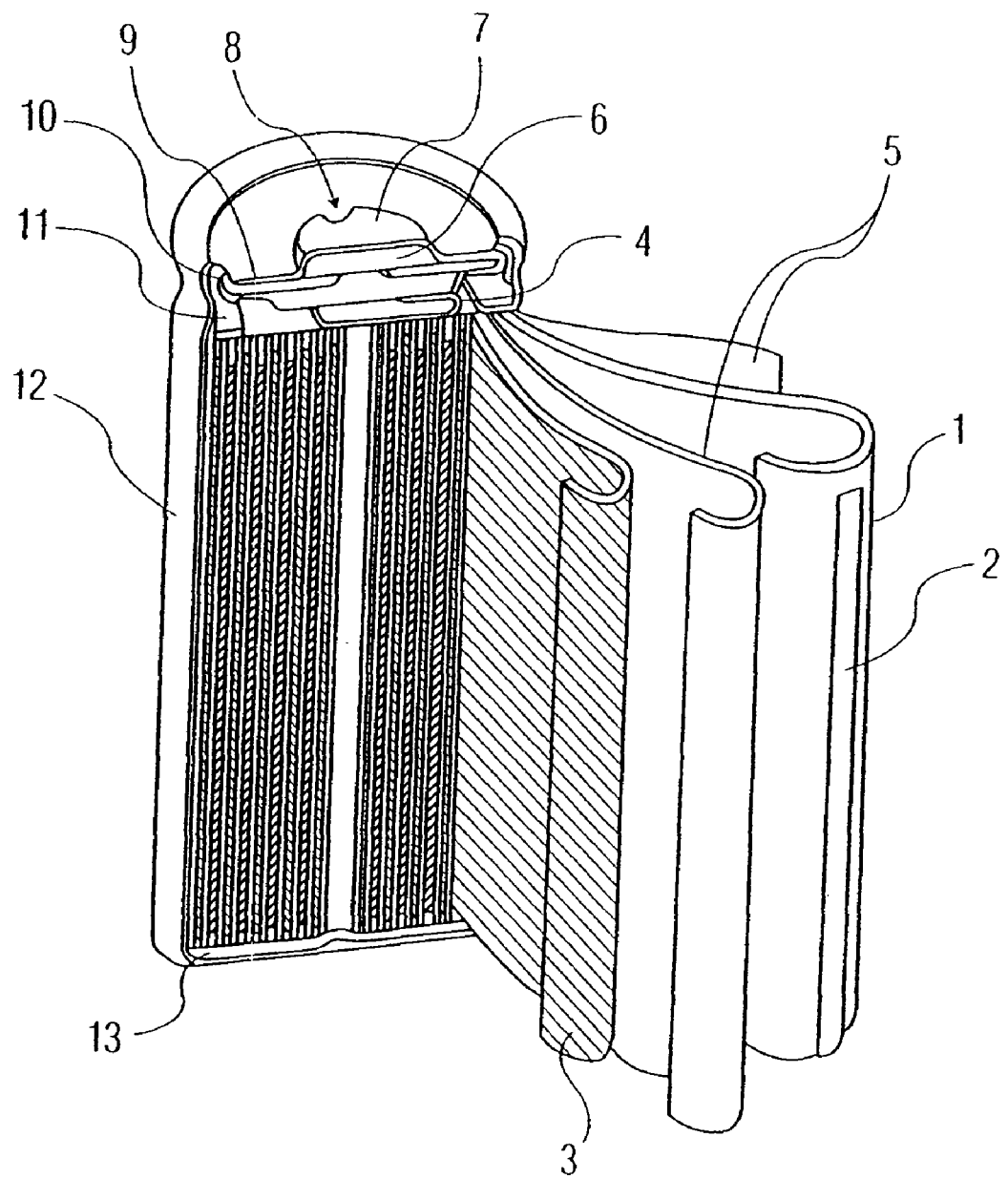
FIG. 1 is a schematic drawing of a non-aqueous electrolyte secondary battery.

Referring to FIG. 1, a non-aqueous secondary battery comprises negative electrode 1, negative lead tab 2, positive electrode 3, positive lead tab 4, separator 5, safety vent 6, top 7, exhaust hole 8, PTC (positive temperature coefficient) device 9, gasket 10, insulator 11, battery case or can 12, and insulator 13. Although the non-aqueous secondary battery is illustrated as cylindrical structure, any other shape, such as prismatic, aluminum pouch, or coin type may be used. Negative electrode 1, positive electrode 3, separator 5 are contained within battery case 12. A non-aqueous electrolyte is between the positive electrode 3 and the negative electrode 1.

Electrode Active Material

The electrode active material has the overall composition: $Si_aM_bP_c$;
in which:
$0<a<1$, $0 \leq b<1$, $0<c<1$, and $a+b+c=1$; and
M is selected from the group consisting of Mn, Co, Ni, Sn, Fe, and mixtures thereof.

The electrode active material comprises silicon, phosphorus, and optionally, one or metals selected from the group consisting of manganese, cobalt, nickel, tin, and iron. The electrode active material may be a single material that has the indicated composition. Alternatively, it may be a mixture of materials that has the indicated overall composition.

When b=0, the electrode active material has the formula $Si_aP_c$; in which $0<a<1$, $0<c<1$, and $a+c=1$. That is, the electrode active material is a binary composition containing silicon and phosphorus. Preferred silicon/phosphorus binary compositions include to $SiP_2$ (i.e., $Si_{0.33}P_{0.67}$), SIP (i.e., $Si_{0.5}P_{0.5}$), $Si_{12}P_5$ (i.e., $Si_{0.706}P_{0.294}$), and their composites with silicon. A typical composite is SiP+Si. The composite can be amorphous, crystalline, or a mixture of both amorphous and crystalline materials. The electrode active material may also be a nano-layered Si-M-P composite mixture. Because $SiP_2$, SiP and $Si_{12}P_5$ have a layered crystal structure, these materials have better charge discharge characteristics. Due to the layered structure, lithium ions can easily move into the host lattice. This leads to better overall battery performance, such as longer cycle life and superior charge and discharge characteristics.

When $0<b<1$, the electrode active material is an at least ternary composition that includes, phosphorus, silicon, and a metal selected from the group consisting of Mn, Co, Ni, Sn, Fe, and mixtures thereof. Examples of mixtures of metals that may be used as M include, for example, $Sn_{1-x}Mn_x$ where $0<x<1$; $Sn_{1-x}Co_x$ where $0<x<1$; $Sn_{1-x}Ni_x$ where $0<x<1$; $Ni_{1-x}Co_x$ where $0<x<1$; $Ni_{1-x}Mn_x$ where $0<x<1$; $Co_{1-x}Mn_x$ where $0<x<1$; $Fe_{1-x}Mn_x$ where $0<x<1$; $Co_{1-x}Fe_x$ where $0<x<1$; $Sb_{1-x}Fe_x$ where $0<x<1$; and $Ni_{1-x}Fe_x$ where $0<x<1$.

In various embodiments of the invention: $b \leq 0.20$; $b \leq 0.15$; $b \leq 0.10$; $b \leq 0.8$; $b \geq 0.01$; $b \geq 0.03$; and $b \geq 0.05$. A preferred composition is, for example, $Si_9M_{4.2}P_{16}$. (i.e., $Si_{0.31}M_{0.14}P_{0.55}$).

Although the oxygen content of the electrode active materials is desirably zero, some oxygen may be introduced during preparation of the electrode active material. However, any oxygen that is present in the electrode active material is not considered in calculation of the formula $Si_aM_bP_c$.

As will be apparent to those skilled in the art, the electrode active material of the invention may be either the positive electrode active material or the negative electrode active material, depending on the redox potential of the other electrode in the non-aqueous secondary battery. When used in a battery with the Li/Li$^+$ redox couple, for example in a battery in which a carbon material capable of absorbing and desorbing lithium, such as graphite, is used in the other electrode, the electrode comprising the electrode active material of the invention is the positive electrode (cathode). The electrode active material of the invention is the positive electrode active material.

However, when used in a non-aqueous secondary battery with, for example a transition metal oxide capable of occluding and of releasing lithium ions and with an average discharge potential in the range of 3.5 to 4.0 V with respect to lithium, the electrode comprising the electrode active material of the invention is the negative electrode (anode), and the electrode active material of the invention is the negative electrode active material. Typically, the electrode active material of the invention will be the negative electrode active material. Transition metal oxides that can be used as the positive electrode active material include, for example, lithium cobalt oxide ($LiCoO_2$), lithium manganese oxide ($LiMn_2O_4$), LiFePO4 (olivine), a solid solution material ($LiCo_xNi_yM$-$n_zO_2$, $Li(Co_aNi_bMn_c)_2O_4$) with a plurality of transition metals introduced thereto, $Li(Mn_{0.5}Ni_{0.5})O_2$, $Li(Mn_{1/3}Co_{1/3}Ni_{1/3})O_2$, nano-composite of $Li_2MnO_3$—$Li(Mn_{1/3}Co_{1/3}Ni_{1/3})O_2$ materials, and the like.

The average diameter of particles of these positive electrode active materials is preferably about 1-30 μm.

Negative Electrode

Negative electrode 1 typically comprises a first current collector and, on the current collector, a mixture comprising a negative electrode active material, a first conductive material, and a first binder. The first current collector can be any conductive material that does not chemically change within the range of charge and discharge electric potentials used. Typically, the first current collector is a metal such as copper, nickel, iron, titanium, or cobalt; an alloy comprising at least one of these metals such as stainless steel; or copper or stainless steel surface-coated with carbon, nickel or titanium. The first current collector may be, for example, a film, a sheet, a mesh sheet, a punched sheet, a lath form, a porous form, a foamed form, a fibrous form, or, preferably, a foil. A foil of copper or a copper alloy, or a foil having a copper layer deposited on its surface by, for example electrolytic deposition, is preferred. The current collector is typically about 1-500 µm thick. It may also be roughened to a surface roughness of Ra is 0.2 µm or more to improved adhesion of the mixture of the negative electrode active material, the first conductive material, and the first binder to the first current collector.

At least part of the surface of the negative electrode active material is covered with the first conductive material. Any conductive material known in the art can be used. Typical conductive materials include carbon, such as graphite, for example, natural graphite (scale-like graphite), synthetic graphite, and expanding graphite; carbon black, such as acetylene black, KETZEN® black (highly structured furnace black), channel black, furnace black, lamp black, and thermal black; conductive fibers such as carbon fibers and metallic fibers; metal powders such as copper and nickel; organic conductive materials such as polyphenylene derivatives; and mixtures thereof. Synthetic graphite, acetylene black, and carbon fibers are preferred.

The binder for the negative electrode can be either a thermoplastic resin or a thermosetting resin. Useful binders include: polyethylene, polypropylene, polytetrafluoroethylene (PTFE), polyvinylidene fluoride (PVDF), styrene/butadiene rubber, tetrafluoroethylene/hexafluoropropylene copolymers (FEP), tetrafluoro-ethylene/perfluoro-alkyl-vinyl ether copolymers (PFA), vinylidene fluoride/hexafluoropropylene copolymers, vinylidene fluoride/chlorotrifluoroethylene copolymers, ethylene/-tetrafluoroethylene copolymers (ETFE), polychlorotrifluoroethylene (PCTFE), vinylidene fluoride/pentafluoropropylene copolymers, propylene/tetrafluoroethylene copolymers, ethylene/chlorotrifluoroethylene copolymers (ECTFE), vinylidene fluoride/-hexafluoropropylene/tetrafluoroethylene copolymers, vinylidene fluoride/perfluoromethyl vinyl ether/tetrafluoroethylene copolymers, and mixtures thereof. Polytetrafluoroethylene and polyvinylidene fluoride are preferred binders.

The negative electrode may be prepared by mixing the negative electrode active material, the first binder, and the first conductive material with a solvent, such as N-methylpyrrolidone. The resulting paste or slurry is coated onto the first current collector by any conventional coating method, such bar coating, gravure coating, die coating, roller coating, or doctor knife coating. Typically, the resulting coated first current collector is dried to remove the solvent and then rolled under pressure after coating. The mixture of negative electrode active material, first binder, and first conductive material typically comprises the negative electrode active material, at least enough first conductive material for good conductivity, and at least enough first binder to hold the mixture together. The negative electrode active material may typically comprise from about 1 wt % to about 99 wt % of the mixture of negative electrode active material, first binder, and first conductive material.

Positive Electrode

Positive electrode 3 typically comprises a second current collector and, on the second current collector, a mixture comprising a positive electrode active material, a second conductive material, and a second binder. Typical second current collectors, second conductive materials, and second binders for the positive electrode include the first current collectors, first conductive materials, and first binders described above for the negative electrode.

The positive electrode can be prepared by mixing the positive electrode active material, the second binder, and the second conductive material with a solvent and coating the resulting slurry on the second current collector and processing the resulting coated second current collector as was described for preparation of the negative electrode. In the non-aqueous electrolyte secondary battery, preferably at least the surface of the negative electrode having the mixture comprising the negative electrode active material is facing the surface of the positive electrode having the mixture comprising the positive electrode active material.

Non-Aqueous Electrolyte and Separator

The non-aqueous electrolyte is typically capable of withstanding a positive electrode that discharges at a high potential of 3.5 to 4.0 V and also capable of withstanding a negative electrode that charges and discharges at a potential close to lithium. The non-aqueous electrolyte comprises a non-aqueous solvent, or mixture of non-aqueous solvent, with a lithium salt, or a mixture of lithium salts, dissolved therein.

Typical non-aqueous solvents include, for example, cyclic carbonates as ethylene carbonate (EC), propylene carbonate (PC), dipropylene carbonate (DPC), butylene carbonate (BC), vinylene carbonate (VC), phenyl ethylene carbonate (ph-EC), and vinyl ethylene carbonate (VEC); open chain carbonates as dimethyl carbonate (DMC), diethyl carbonate (DEC), ethylmethyl carbonate (EMC); amides, such as formamide, acetamide, and N,N-dimethyl formamide; aliphatic carboxylic acid esters such as methyl formate, ethyl formate, methyl acetate, ethyl acetate, methyl propionate and ethyl propionate; diethers, such as 1,2-dimethoxyethane (DME), 1,2-diethoxyethane (DEE), and ethoxymethoxyethane (EME); cyclic ethers such as tetrahydrofuran, 2-methyl tetrahydrofuran, and dioxane; other aprotic organic solvents, such as acetonitrile, dimethyl sulfoxide, 1,3-propanesulton (PS) and nitromethane; and mixtures thereof. Typical lithium salts include, for example, lithium chloride (LiCl), lithium bromide (LiBr), lithium trifluoromethyl acetate ($LiCF_3CO_2$), lithium hexafluorophosphate ($LiPF_6$), lithium perchlorate ($LiClO_4$), lithium tetrafluoroborate ($LiBF_4$), lithium trifluoro-methansulfonate ($LiCF_3SO_3$), lithium hexafluoroarsenate ($LiAsF_6$), bis(trifluoromethyl)sulfonylimido lithium [$LiN(CF_3SO_2)_2$], lithium bisoxalato borate ($LiB(C_2O_4)_2$), and mixtures thereof.

Preferably, the non-aqueous electrolyte is one obtained by dissolving lithium hexafluoro phosphate ($LiPF_6$) in a mixed solvent of ethylene carbonate (EC), which has a high dielectric constant, and a linear carbonate or mixture of linear carbonates that are low-viscosity solvents, such as, for example, diethyl carbonate (DEC), dimethyl carbonate (DMC), ethyl methyl carbonate (EMC). The concentration of lithium ion in the non-aqueous electrolyte is typically about 0.2 mol/l to about 2 mol/l, preferably about 0.5 mol/l to about 1.5 mol/l.

Other compounds, or additives, may be added to the non-aqueous electrolyte in order to improve discharge and charge/discharge properties. Such compounds include triethyl phosphate, triethanolamine, cyclic ethers, ethylene diamine, pyridine, triamide hexaphosphate, nitrobenzene derivatives, crown ethers, quaternary ammonium salts, and ethylene glycol di-alkyl ethers.

Separator 5, between the positive electrode and the negative electrode, is insoluble and stable in the electrolyte solution. It prevents short circuits by insulating the positive electrode from the negative electrode. Insulating thin films with fine pores, which have a large ion permeability and a predetermined mechanical strength, are used. Polyolefins, such as polypropylene and polyethylene, and fluorinated polymers such as polytetrafluoroethylene and polyhexafluoropropylene, can be used individually or in combination. Sheets, non-wovens and wovens made with glass fiber can also be used. The diameter of the fine pores of the separators is typically small enough so that positive electrode active materials, negative electrode active materials, binders, and conductive materials that separate from the electrodes can not pass through the separator. A desirable diameter is, for example, 0.01-1 µm. The thickness of the separator is generally 10-300 µm. The porosity is determined by the permeability of electrons and ions, material and membrane pressure, in general however, it is desirably 30-80%.

For polymer secondary batteries, gel electrolytes comprising these non-aqueous electrolytes retained in the polymer as plasticizers, have also been used. Alternatively, the electrolyte may be polymer solid electrolyte or gel polymer electrolyte, which comprises a polymer solid electrolyte mixed with organic solvent provided as a plasticizer. Effective organic solid electrolytes include polymer materials such as derivatives, mixtures and complexes of polyethylene oxide, polypropylene oxide, polyphosphazene, polyaziridine, polyethylene sulfide, polyvinyl alcohol, polyvinylidene fluoride, polyhexafluoropropylene. Among inorganic solid electrolytes, lithium nitrides, lithium halides, and lithium oxides are well known. Among them, $Li_4SiO_4$, $Li_4SiO_4$—LiI—LiOH, $xLi_3PO_4$-$(1-x)Li_4SiO_4$, $Li_2SiS_3$, and $Li_3PO_4$-$Li_2S$—$SiS_2$ are effective. Lithium ion conductors may also be used as the solid electrolyte. Lithium ion conductors are disclosed, for example, in R. Murugan, et al., *Angew. Chem. Int. Ed.,* 46, 7778-7781 (2007); K. Cho, *Solid State Ionics,* 178, 119-123 (2007); Zhang, U.S. Pat. No. 5,716,736, Bates, U.S. Pat. Nos. 6,818,356 and 6,994,933, Iwamoto, U.S. Pat. No. 7,288,340; and Park, U.S. Pat. No. 7,273,682, the disclosures of which are incorporated herein by reference. Lithium ion conductors include, for example, sulfide glasses, lithium phosphorus oxynitride (LiPON) ($Li_{3-x}PO_{4-y}N_z$); lithium titanium phosphate ($LiTi_2(PO_4)_3$); lithium germanium phosphate ($LiGe_2(PO_4)_3$); $Li_2O$—$SiO_2$; $Li_3PO_4Li_4SiO_4$; $Li_2O$—$V_2O_5$—$SiO_2$; $Li_2O$—$P_2O_5$—$B_2O_3$, $Li_2O$—$GeO_2$; $Li_2S$—$SiS_2$, $Li_2S$—$GeS_2$; $Li_2S$—$GeS_2$—$Ga_2S_3$; $Li_2S$—$P_2S_5$; $Li_2S$—$B_2S_3$; $Li_5La_3M_2O_{12}$, in which M is Nb or Ta; $Li_7La_3Zr_2O_{12}$; and $Li_2O$—$B_2O_3$—$P_2O_5$. When a gel electrolyte or a solid electrolyte is used, a separator is typically not necessary.

Positive electrode 1, negative electrode 3, and the electrolyte are contained in battery case or can 12. The case may be made of example, titanium, aluminum, or stainless steel that is resistant to the electrolyte. As shown in FIG. 1, the a non-aqueous secondary battery may also comprise lead tabs, safety vents, insulators, and other structures.

Preparation of the Electrode Active Materials

In one procedure for preparation of the electrode active materials of the invention, the starting materials, that is the silicon (Si), phosphorus (P) and, optionally, the metal or metals (M) are mixed together in a predetermined molar ratio. The starting materials may be mixed, for example, as dry powders, or dispersed in a solvent for wet grinding and then dried. During or after mixing, the resulting mixture of starting materials is heated in a non-oxidizing atmosphere or a vacuum to produce the composite phosphide of silicon and, if present, the metal or metals (M).

The mixture of starting materials can be heated directly or can be pressed into a pellet before heating. The mixture can be jacketed in evacuated sealed silica ampoule or sealed into a metal container first and then jacketed into evacuated silica ampoule. The heating rate and cooling rate can be controlled, or the heated materials can be quenched from high-temperatures using, for example, liquid nitrogen. The duration of heating and subsequent heat cycles can also be controlled to achieve the desired material. Heating after or while these materials are mixed differs depending on the starting materials or the thermal treatment atmosphere. The electrode active materials may be synthesized at a temperature equal to or less than 1000° C. at the first heating, more preferably at a temperature equal to or more than 600° C. on first heating. Regrinding after the first heating, followed by a second heating in suitable atmosphere can vary from 700° C. to 1500° C. more preferably below 1300° C. To promote the synthesis reaction and to increase the uniformity of the product, the processes of heating, cooling/quenching, grinding/mixing and reheating can be carried out.

One method to synthesize phosphides of the formula $Si_aP_c$ is from elemental silicon and elemental P by thermal treatment as described above. When using silicon or silicon with a low level of silicon oxide as the source of silicon and using elemental phosphorus as the source of phosphorus, the phosphide can be synthesized by thermal-treatment of the mixture of these materials in a non-oxidizing atmosphere. After silicon and phosphorus are mixed at a predetermined mole ratio or while being mixed, the mixture is heated in a non-oxidizing atmosphere, such as inert atmosphere or a vacuum, or in an atmosphere where the amount of oxygen is controlled, such as an evacuated sealed tube sealed in a metal container.

Another method of producing electrode active materials of the formula $Si_aM_bP_c$, in which b is not equal to zero, is to first prepare a phosphide, $Si_aP_c$, and then react the phosphide with the metal or metals, M. Another method is to first prepare a compound of M and P, and then react it with Si to obtain desired negative electrode active material.

Other methods for preparing the electrode active materials may be used. For example, another method is to atomize or ionize these materials by heating or with electromagnetic radiation, such as with light, and simultaneously, or alternatively, to vaporize and deposit the same by, for example, laser pyrolysis. Reaction in the gas phase can sometimes produce fine particles at low synthesis temperature compared to the high temperature required by solid state synthesis. Synthesis at high pressure may also be applicable to the preparation of the electrode active materials.

Incorporation of lithium into the electrode active materials can be accomplished by electrochemical reaction within a battery after assembling the battery. Alternatively, incorporation may be carried out inside or outside the battery depending on the production process of the battery. In method (A), the electrode active material of the invention is mixed with a conductive agent and a binding agent and formed into a predetermined shape to obtain an electrode (working electrode). Lithium metal or a material containing lithium metal is used as the other electrode (counter electrode). The electrodes are arranged opposing each other in contact with non-aqueous electrolyte that conducts lithium ions to form an electrochemical cell, and a suitable current in a direction to conduct lithium ions to the working electrode is passed through the cell so that lithium is electrochemically incorporated into the electrode active material. The resulting working electrode is either used as a electrode or used as the electrode active material for a lithium non-aqueous secondary battery.

In method (B), lithium metal, lithium alloy, or a material containing lithium metal is press fit or contact bonded to the working electrode to produce a laminated electrode. The laminated electrode is assembled into a lithium non-aqueous electrolyte secondary battery. By contacting the laminated electrode with the electrolyte within the battery, a local cell is formed and the lithium is thus electrochemically incorporated into the electrode active material. In method (C), an electrode comprising the electrode active material of the invention is used as in one electrode and a material containing lithium and capable of incorporating and releasing lithium ions is used as the electrode active material in the other electrode. Lithium ions released from the other electrode active material by charging are incorporated into the electrode active material of the invention. Lithium can also be introduced into electrode active material of the invention by chemical method by using organo-lithium compounds in a suitable solvent media at an appropriate temperature.

INDUSTRIAL APPLICABILITY

This invention provides an electrode, typically a negative electrode, for a non-aqueous secondary battery as well as a non-aqueous secondary battery of high reliability and safety. These non-aqueous secondary batteries are used in portable electronic devices such as personal computers, cell phones and personal digital assistants, as well as audio-visual electronic devices, such as video camcorders and mini-disc players.

The advantageous properties of this invention can be observed by reference to the following examples, which illustrate but do not limit the invention.

EXAMPLES

Example 1

This Example illustrates the preparation of electrode active materials of the invention. Elemental silicon, elemental phosphorus, and, optionally, elemental tin, were mixed in a $ZrO_2$ planetary ball mill. Four zirconium oxide balls were used to grind the material. The grinding speed and time were varied to achieve homogeneous mixing of the materials with minimum loss of zirconium oxide ball weight. Table 1 lists the experimental conditions for the mixing of the starting materials. Table 2 lists the reaction condition for the solid state reactions. Quenching was carried out by quenching in liquid nitrogen ($LN_2$) or by furnace cooling (FC). Powder X-ray diffraction patterns were recorded using Rigaku powder x-ray diffractometer.

TABLE 1

| No. | Amount of Si (mol) | Amount of P (mol) | Amount of Sn (mmol) | Grinding conditions (rpm) | Time (h) | Ball/total sample mass ratio |
|---|---|---|---|---|---|---|
| 1 | 0.12 | 0.05 | None | 200 | 3 | 8:1 |
| 2 | 0.12 | 0.05 | 8.28 | 200 | 3 | 8:1 |

These powders were pressed into pellets (0.78 mm dia; 15 M Pa) and sealed into evacuated $SiO_2$ ampoules. Heating was carried out in a muffle furnace controlled by a programmable temperature controller. Some samples were quenched with liquid nitrogen ($LN_2$). The ampoules were opened in an argon-filled glove box and ground using agate mortar and pestle.

TABLE 2

| No. | Si (Mol) | P (Mol) | Sn (mmol) | Heating | Cooling |
|---|---|---|---|---|---|
| 3[a] | 0.05 | 0.05 | None | 600° C., 24 h; 1100° C., 24 h | FC |
| 4 | 0.05 | 0.05 | 4.97 | 600° C., 24 h; 1100° C., 24 h | FC |
| 5[b] | 0.12 | 0.05 | 4.14 | 1150° C., 24 h | $LN_2$ |
| 6 | 0.12 | 0.05 | None | 700° C., 12 h; 1150° C., 24 h | FC |
| 7[c] | 0.12 | 0.05 | 8.28 | 700° C., 12 h; 1150° C., 24 h | FC |

Figure 2:
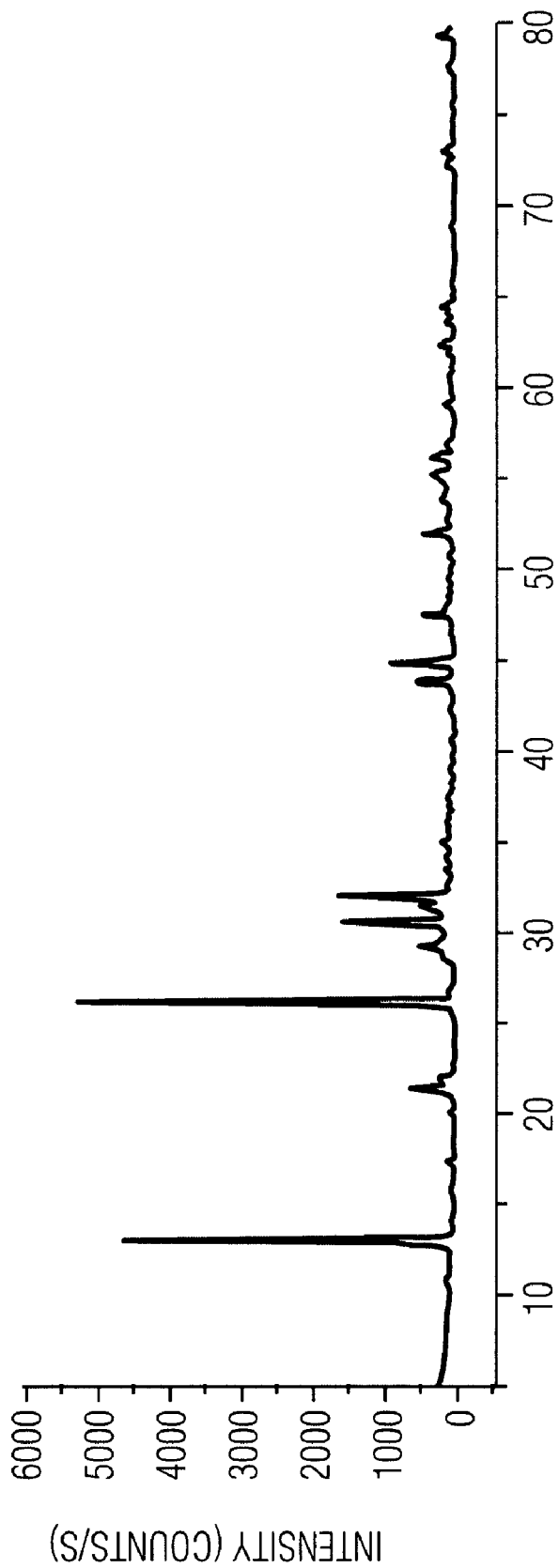
FIG. 2 shows the X-ray (Cu Kα) powder diffraction pattern of a mixture of silicon and phosphorus (1:1 molar ratio) ground together in a planetary ball mill, heated at 600° C. for 24 hours, then heated at 1100° C. for 24 hours, and furnace cooled.
Figure 3:
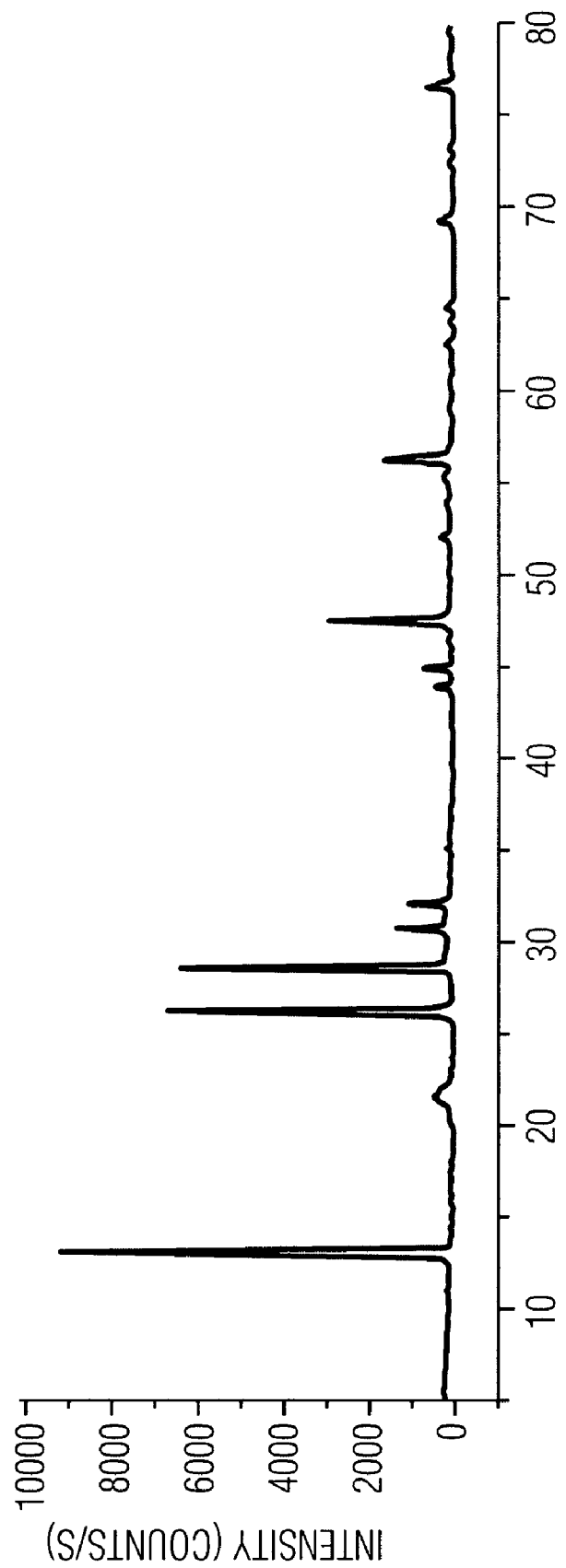
FIG. 3 shows the X-ray (Cu Kα) powder diffraction pattern of a mixture of silicon, phosphorus, and tin (12:5:0.414 molar ratio) ground together in a planetary ball mill, heated at 1150° C. for 24 hours and quenched with liquid nitrogen.
Figure 4:
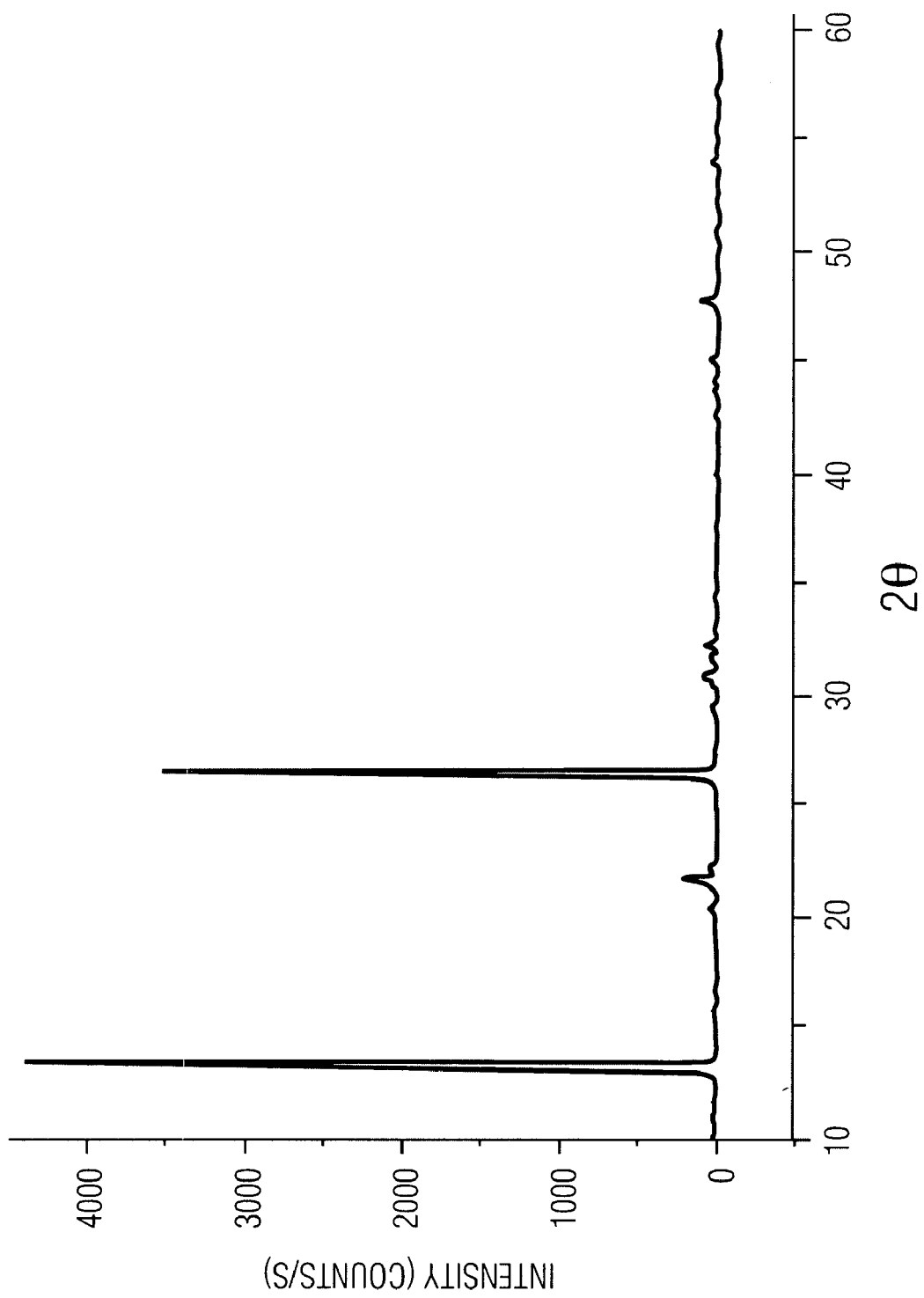
FIG. 4 shows the X-ray (Cu Kα) powder diffraction pattern of a mixture of silicon, phosphorus, and tin (12:5:0.828 molar ratio) ground together in a planetary ball mill, heated at 700° C. for 12 hours, heated at 1150° C. for 24 hours, and then allowed to cool to room temperature.

[a]SiP; see FIG. 2 for the X-Ray diffraction pattern.
[b]See FIG. 3 for the X-Ray diffraction pattern.
[c]$Si_{12}P_5$; see FIG. 4 for the X-Ray diffraction pattern.

FIG. 2, FIG. 3, and FIG. 4 are typical X-ray diffraction powder patterns for the electrode active materials. To promote the synthesis reaction, and to raise its uniformity, some samples were treated several times the processes of heating, cooling/quenching, grinding/mixing and repeated heating cycles is necessary for the solid state reaction.

Example 2

This Example illustrates the preparation of batteries for the evaluation of the electrode active materials of the invention. The electrode active material, carbon black as a conductive material, polyvinylidene fluoride (PVDF) binder, and N-methyl pyrollidone (NMP) solvent were well mixed. The resulting mixture was coated single side of a 10 micrometer thick copper foil with a doctor blade, dried at 80° C. for 4 hr, and calendared to a thickness of 150 micrometer.

For testing purposes, lithium metal was used as the opposite electrode. Because $Li^+/Li$ has a lower potential than the electrode active materials of the invention, the lithium electrode becomes the negative electrode, and the electrode comprising the active material of the invention becomes the positive electrode. However, the electrode active materials of the invention are negative with respect to many commonly used electrode active material, such as $LiCoO_2$.

The lithium electrode was fabricated by cutting lithium metal sheet of 200 micron thickness using a circular punch and adhered to a stainless steel or nickel disk (0.33 mm) spot welded with a stainless steel mesh. This circular lithium metal electrode with stainless steel or nickel current collector was used a negative electrode to insert and de-insert lithium from our test materials. The 2016 coin cells were fabricated using lithium metal as anode and Si-M-P composite material as cathode separated by CELEGRAD® 2320 separator and 1.25 M $LiPF_6$ in ethylene carbonate (EC):ethyl methyl carbonate (EMC) (1:3) formulations were used as an electrolyte.

Swagelok cells were constructed using the lithium metal as an anode and Si-M-P composite as cathode and CELEGRAD® 2320 separator. 1.25 M $LiPF_6$ in ethylene carbonate (EC):ethyl methyl carbonate (EMC) (1:3) formulations were used as an electrolyte. The electrodes were held together using a Swagelok assembly with stainless steel pistons using TEFLON® fluorocarbon resin ferrules, stainless steel spring and KAPTON® polyimide film surrounding the stainless steel piston, current collectors and separator from the main body.

Example 3

A Swagelok cell was fabricated following the procedure of Example 2, using SiP prepared in Example 1 (Sample #3) as the electrode active material. A CELGUARD® #2320 PE separator and electrolyte of 25 wt % of 1.25 M $LiPF_6$ in ethylene carbonate and 75 wt % of ethyl methyl carbonate were used.

TABLE 3

| Sample | Active Material (%) | Binder (PVDF) (%) | Ketzen ® Black (%) | Total Capacity (mAh/g) 0.05 C | 0.1 C | 0.5 C | 1.0 C |
|---|---|---|---|---|---|---|---|
| SiP | 74.3 | 15.1 | 10.6 | 1307 | 905 | 568 | 416 |
| SiP | 42.8 | 41.3 | 15.9 | 1780 | 1191 | 702 | 539 |

The electrochemical curve shows different plateaus upon lithium insertion and the total discharge capacity of (3 to 0 volt) about 3500 mAh/g at 0.05 C rate was observed. The charge capacity of 1780 mAh/g was observed for the first cycle with 0.05 C rate, 1191 mAh/g for the second cycle with 0.1 C rate, 702 mAh/g for the third cycle with 0.5 C rate and 539 mAh/g for the fourth cycle with 1 C rate respectively. An insertion or de-insertion rate of 1 C is the insertion or de-insertion of one lithium/hr per formula unit of the material. That is, the electrochemical conversion of one formula unit of SiP to LiSiP in one hour is a lithium insertion rate of 1 C.

A mixture of SIP, acetylene black, multiwalled carbon nano-tubes, and PVDF in the ratio 35:31:3.5:29.5 was coated on a copper current collector under an inert atmosphere. Thermal gravimetric analysis (TGA) and differential scanning calorimetry were carried out on the sample. The material could be heat treated at temperatures up to 350° C. in an inert atmosphere without significant loss of material. A weight loss of less than 2 wt % was observed on heating to 350° C.

A sample consisting of a mixture of SiP, acetylene black, multiwalled carbon nano-tubes, and PVDF in the ratio 35:31:3.5:29.5 on a copper current collector was annealed at 320° C. in 1% hydrogen in argon. The results for charge/discharge cycles (charge discharge rate=C/10) for the annealed sample and a similar sample that had not been annealed are shown in Table 4. Measurement of the unannealed material was discontinued after the fourth cycle:

TABLE 4[a]

| Sample | | 1st Cycle | 2nd Cycle | 3rd Cycle | 4th Cycle | 5th Cycle |
|---|---|---|---|---|---|---|
| SiP Unannealed | Discharge | 1813 | 81 | 45 | 33 | |
| | Charge | 185 | 85 | 46 | 33 | |
| SiP Annealed | Discharge | 2291 | 1005 | 886 | 805 | 698 |
| | Charge | 886 | 824 | 773 | 698 | 611 |

| Sample | | 6th Cycle | 7th Cycle | 8th Cycle | 9th Cycle | 10th Cycle |
|---|---|---|---|---|---|---|
| SiP Annealed | Discharge | 618 | 595 | 585 | 570 | 570 |
| | Charge | 575 | 570 | 569 | 569 | 569 |

[a]Charge discharge rate = C/10

Example 4

This example illustrates evaluation of a phosphorus, tin, silicon composite. A R2016 coin cell was fabricated with a CELGUARD® #2320 PE separator following the procedure of Example 2 and evaluated as in Example 3. The electrolyte was 25 wt % of 1.25 M LiPF6 in ethylene carbonate and 75 wt % of ethyl methyl carbonate. After the addition of electrolyte, the cell cups were vacuum dried overnight before final assembly. The composition is shown in Table 5. Sample 4 from Example 1, a phosphorus-tin-silicon composite, was used as the electrode active material. The cells were tested from 0 to 3 V. Results are shown in Table 5.

TABLE 5

| Sample | Active Material (%) | Binder (PTFE) (%) | Acetylene Black (%) | Total Capacity (mAh/g) 0.05 C | 0.1 C |
|---|---|---|---|---|---|
| Si—Sn—P | 70.1 | 9.9 | 19.9 | 133 | 117 |

R2016 coin cells were fabricated with CELGUARD® #2320 PE separator, PVDF binder and KETZEN® black following the procedure of Example 2. The electrolyte was 25 wt % of 1.25 M LiPF6 in ethylene carbonate and 75 wt % of ethyl methyl carbonate. The compositions are shown in Table 6.

TABLE 6

| Sample | Active Material (%) | Binder (PVDF) (%) | Ketzen ® Black (%) | Total Capacity (mAh/g) 0.05 C | 0.1 C | 0.5 C | 1.0 C |
|---|---|---|---|---|---|---|---|
| Si—Sn—P | 68.9 | 15.1 | 16.0 | 1892 | 1553 | 1120 | 931 |
| Si—Sn—P | 43.6 | 41.9 | 14.5 | 2054 | 1633 | 1278 | 1121 |

Example 5

Sample 6 from Example 2 was evaluated following the procedure of Example 3. The results are given in Table 7. Sample 6 is $Si_{12}P_5$ (the silicon-rich composition in the binary silicon/phosphorus phase diagram). See J. R. A. Carlson, et al., *J. Vac. Sci. Technol. A,* 1997, 15(2), 394, incorporated herein by reference. Results are given in Table 7.

TABLE 7

| Sample | Active Material (%) | Binder (PVDF) (%) | Ketzen ® Black (%) | Total Capacity (mAh/g) 0.05 C | 0.1 C | 0.5 C | 1.0 C |
|---|---|---|---|---|---|---|---|
| $Si_{12}P_5$ | 43.9 | 42.7 | 13.4 | 1661 | 901 | 609 | 562 |

Example 6

Figure 5:
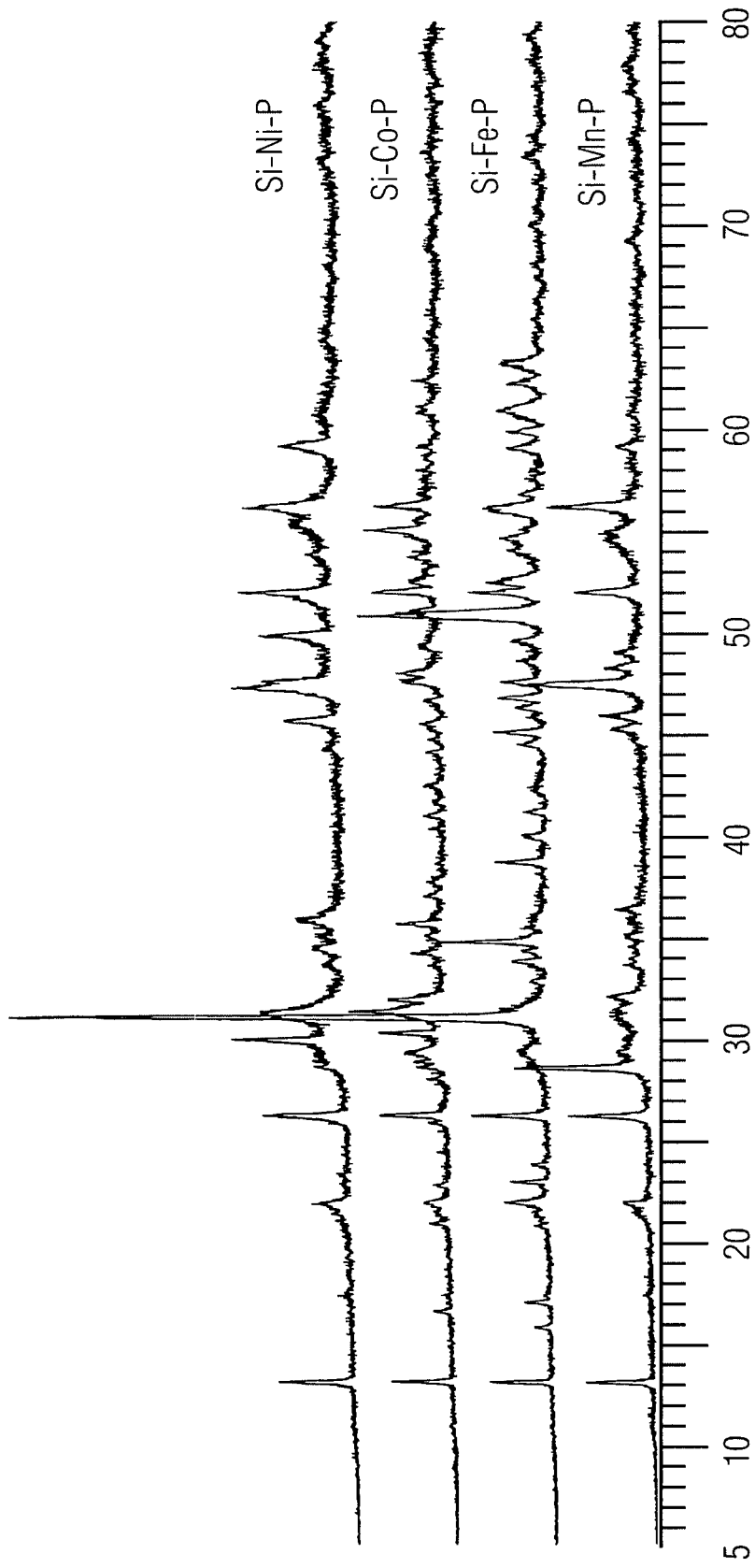
FIG. 5 shows the X-ray (Cu Kα) powder diffraction patterns for Si-M-P ternary compositions.

Si-M-P ternary compositions were prepared by the following procedure. Mixtures of silicon, phosphorus, and either manganese, iron, cobalt, or nickel were ball milled at 200 rpm for 2 hr as described in Example 1. Elemental silicon, elemental phosphorus, and fine metal powders (<200 micrometer, Aldrich) were mixed in a 1:0.1:1 weight ratio. The resulting mixtures were pressed into pellets and sealed into evacuated ($10^{-6}$ torr) silica ampoules as described in Example 1. The mixtures were heated at 1050° C. for 24 hr. X-ray powder diffraction pattern (Cu Kα) pattern for the resulting Si-M-P ternary compositions are shown in FIG. 5. Results are shown in Table 8.

TABLE 8

| Composition | Phase 1 | Phase 2 |
|---|---|---|
| Si—Mn—P | SiP | MnP |
| Si—Fe—P | SiP | $FeSi_4P_4$ (very strong) |
| Si—Co—P | SiP | $CoSi_3P_3$ (strong) |
| Si—Ni—P | SiP | $NiSi_3P_4$ (strong) |

The diffraction patterns confirmed the formation of some ternary phases for iron, cobalt, and nickel. Manganese formed a binary phase with phosphorus. Other unidentified phases were also present in each sample.

The scanning electron microscope image of Si—Co—P shows flakey morphology. The Si—Ni—P image shows needle, ribbon or thread like morphology, indicating metal catalyzed growth of SiP. The thickness of the flakes and ribbon were in nano-scale dimensions and the lengths of the rods are in micrometer scale. For Si—Mn—P and Si—Fe—P, the powder morphology was not distinct as compared to Si—Co—P and Si—Ni—P. Because the powder X-ray diffraction only gives details for crystalline phases, the presence of amorphous components can not be ruled out.

Surface area was determined by BET surface area analysis. Results are given in Table 9.

TABLE 9

| Composition | Heating | Surface Area ($m^2/g$) |
|---|---|---|
| Si—Mn—P | RT-12 h; 1050° C. 24 h; RT-1 h | 1.80 ± 0.04 |
| Si—Fe—P | RT-12 h; 1050° C. 24 h; RT-1 h | 1.86 ± 0.05 |
| Si—Co—P | RT-12 h; 1050° C. 24 h; RT-1 h | 1.09 ± 0.04 |
| Si—Ni—P | RT-12 h; 1050° C. 24 h; RT-1 h | 1.50 ± 0.02 |

SEM-EDX analysis of Si—X—P gave the following analyses. For Si—Mn—P: 40.3±0.2 wt % Si, 42.1±0.2, wt % P, 8.0±0.2 wt % Mn, and 9.7±0.3 wt % O ($Si_{0.49}Mn_{0.05}P_{0.48}$) For Si—Fe—P: 44.4±0.4 wt % Si, 32.3±0.4, wt % P, 10.5±0.3 wt % Fe, and 12.8±0.5 wt % O ($Si_{0.56}Fe_{0.07}P_{0.37}$). For Si—Co—P: 41.4±0.2 wt % Si, 46.2±0.2, wt % P, 1.7±0.1 wt % Co, and 10.6±0.3 wt % O ($Si_{0.58}Co_{0.01}P_{0.41}$). For Si—Ni—P: 41.8±0.2 wt % Si, 40.4±0.2 wt % P, 6.3±0.2 wt % Ni, and 11.5±0.3 wt % O ($Si_{0.51}Ni_{0.04}P_{0.45}$). Oxygen might have come from exposure of the sample to atmosphere or while ball milling during initial mixing of Si-M-P or both.

Use of an appropriate metal as a catalyst to grow the Si—P and Si-M-P compositions produces nano-tubes, ribbons, or any other well defined morphology characteristics. For example, when nickel is used, ribbon, rod-like, and wire morphology was produced. When cobalt was used, flaky morphology was produced. In is expected that the morphology can be tailored by changing the pressure, synthesis temperature, time and the catalyst. This chemistry is similar to the carbon chemistry in which varieties of carbon allotropes were discovered using metal catalysts. Nano-materials have an added advantage as electrode active materials because of the materials have high reaction kinetics and the materials can have variation in band structure, especially semi-conducting materials and metals of nano-dimensions.

Swagelok cells were fabricated as in Example 2 using lithium metal as the anode, Si-M-P composite as the cathode, and CELEGRAD® 2400 separator. In the cathode, the Si-M-P composite, carbon black, and PVDF were used in a 3:1:1 ratio on a stainless steel current collector. 1 M $LiPF_6$ in ethylene carbonate (EC):ethyl methyl carbonate (EMC) (1:3 by volume) was used as an electrolyte. The charge/discharge rate was C/10. The cells were cycled from 0 to 1.5 V. The results for charge/discharge cycles are shown in Table 10.

TABLE 10

| Composition | | $1^{st}$ Cycle | 2nd Cycle | 3rd Cycle | 4th Cycle | 5th Cycle |
|---|---|---|---|---|---|---|
| Si—Mn—P | Discharge | 893 | 509 | 384 | 311 | 246 |
| | Charge | 522 | 394 | 323 | 268 | 222 |
| Si—Fe—P | Discharge | 839 | 482 | 346 | 347 | 287 |
| | Charge | 516 | 342 | 295 | 249 | 207 |
| Si—Co—P | Discharge | 1257 | 883 | 526 | 417 | 334 |
| | Charge | 667 | 519 | 439 | 353 | 297 |
| Si—Ni—P | Discharge | 1107 | 539 | 410 | 318 | 240 |
| | Charge | 541 | 416 | 340 | 264 | 211 |
| Sample | | 6th Cycle | 7th Cycle | 8th Cycle | 9th Cycle | 10th Cycle |
| Si—Mn—P | Discharge | 206 | 182 | 168 | 165 | 153 |
| | Charge | 190 | 174 | 163 | 152 | 147 |
| Si—Fe—P | Discharge | 233 | 200 | 180 | 170 | 160 |
| | Charge | 180 | 168 | 161 | 153 | 148 |
| Si—Ni—P | Discharge | 205 | 187 | 176 | 169 | 162 |
| | Charge | 188 | 175 | 163 | 156 | 151 |

From the second cycle on, the electrochemical behavior of the Si-M-P compositions is similar to that of SiP. The electrochemical behavior Si—Co—P was better than that of the other composites evaluated.

Example 7

This example illustrates evaluation of $SiP_2$ as an electrode active material. $SiP_2$ was synthesized by grinding elemental silicon, elemental phosphorus, and tin in a 1:2:0.1 weight ratio with a $ZrO_2$ grinding media (200 rpm, 2 hr). No significant mass loss of the $ZrO_2$ balls was detected. The material is palletized as in Example 1 and sealed into silica tube under vacuum. The sample was heated at room temperature for 12 hr and at 700° C. for 12 hr and for 0.5 hr at room temperature repeatedly for 4-5 times with intermittent grindings and palletizing and sealing sequence followed by a further heat treatment at 900° C. The powder diffraction pattern of the sample showed $SiP_2$ as the major phase, with $SnP_3$ as an impurity along with some unknown phase or phases. The power particles are micron size with a surface area of 1.29±0.05 $m^2/g$.

Swagelok cells were fabricated as in Example 2 using lithium metal as the anode, SiP2-Sn composite as the cathode, and CELEGRAD® 2400 separator. In the cathode, the SiP2 composite, carbon black, and PVDF were used in a 3:1:1 ratio on a stainless steel current collector. 1 M $LiPF_6$ in ethylene carbonate (EC):ethyl methyl carbonate (EMC) (1:3 by volume) was used as an electrolyte. The charge/discharge rate was C/10. The cells were cycled from 0 to 1.5 V. The results for charge/discharge cycles are shown in Table 11.

TABLE 11

| Composition | | $1^{st}$ Cycle | 2nd Cycle | 3rd Cycle | 4th Cycle | $5^{th}$ Cycle |
|---|---|---|---|---|---|---|
| $SiP_2$ | Discharge | 821 | 390 | 340 | 323 | 308 |
| | Charge | 396 | 334 | 315 | 316 | 391 |

Comparison of the voltage vs capacity curve for SiP and $SiP_2$ shows that from second cycle onwards, $SiP_2$ has a slightly higher voltage reversible reaction than SiP.

Having described the invention, we now claim the following and their equivalents.

What is claimed is:

1. An electrode for a non-aqueous electrolyte secondary battery, the electrode comprising a first electrode current collector, and, on the first electrode current collector, a first electrode active material, in which the first electrode active material has the overall composition: $Si_aM_bP_c$; in which:
   $0.33 \leq a<1$, $0 \leq b<1$, $0<c<1$, and $a+b+c=1$; and M is selected from the group consisting of Mn, Co, Ni, Sn, Fe, and mixtures thereof.

2. The electrode of claim 1 in which b=0.

3. The electrode of claim 2 in which the first electrode active material is selected from the group consisting of $Si_{0.33}P_{0.67}$, $Si_{0.5}P_{0.5}$, $Si_{0.706}P_{0.294}$, and their composites with silicon.

4. The electrode of claim 1 in which $0<b<1$.

5. The electrode of claim 4 in which $0.01 \leq b \leq 0.20$.

6. The electrode of claim 5 in which $0.05 \leq b \leq 0.10$.

7. The electrode of any one of claims 4 to 6 in which M is Mn.

8. The electrode of any of claims 4 to 6 in which M is Co.

9. The electrode of any one of claims 4 to 6 in which M is Ni.

10. The electrode of any one of claims 4 to 6 in which M is Sn.

11. The electrode of any one of claims 4 to 6 in which M is Fe.

12. The electrode of any one of claims 4 to 6 in which M is a mixture of two or more metals selected from the group consisting of Mn, Co, Ni, Sn, and Fe.

13. The electrode of claim 1 in which the electrode comprises, on the first current collector, the first electrode active material and lithium.

14. The electrode of claim 1 in which the electrode comprises, on the first current collector, a mixture of the first electrode active material, a first binder, and a first conductive material.

15. A non-aqueous electrolyte secondary battery comprising:
   a positive electrode comprising a positive active electrode active material;
   a negative electrode comprising a negative active electrode active material;
   a non-aqueous electrolyte between the positive electrode and the negative electrode; in which:
   one of the positive electrode and the negative electrode is the electrode of claim 1.

16. The non-aqueous electrolyte secondary battery of claim 15 in which the other of the positive electrode and the negative electrode comprises a second electrode current collector, and on the second electrode current collector, a second electrode active material, a second conductive material, and a second binder; and the second electrode active material is a material capable of occluding and of releasing lithium ions.

17. The non-aqueous electrolyte secondary battery of claim 15 or claim 16 in which the non-aqueous electrolyte comprises a non-aqueous solvent and lithium salt and the battery additionally comprises a separator between the positive electrode and the negative electrode.

18. The non-aqueous electrolyte secondary battery of claim 15 or claim 16 in which the non-aqueous electrolyte is a solid electrolyte.

19. The non-aqueous electrolyte secondary battery of claim 15 or claim 16 in which the electrode comprising the first current collector is the negative electrode.

20. The non-aqueous electrolyte secondary battery of claim 15 or claim 16 in which the electrode comprising the first current collector is the positive electrode.

21. A method for preparing the electrode for a non-aqueous electrolyte secondary battery of claim 14, the method comprising the steps of: preparing a mixture comprising the first electrode active material, the first conductive material, the first binder, and a solvent; coating the mixture on the first current collector; and drying the mixture on the first current collector to remove the solvent.

22. The method of claim 21 additionally comprising, after drying the mixture to remove the solvent, the step of rolling the mixture comprising the first electrode active material, the first conductive material, and the first binder.

* * * * *

UNITED STATES PATENT AND TRADEMARK OFFICE
CERTIFICATE OF CORRECTION

PATENT NO. : 8,236,447 B2
APPLICATION NO. : 12/515192
DATED : August 7, 2012
INVENTOR(S) : P. Subramanya Herle Page 1 of 1

It is certified that error appears in the above-identified patent and that said Letters Patent is hereby corrected as shown below:

On the cover page, item (56), References Cited, please insert:

-- U.S. PATENT DOCUMENTS

| | | |
|---|---|---|
| 2005/0175901 A1 | 8/2005 | Kawakami et al. |
| 2005/0181276 A1 | 8/2005 | Miyaki |
| 2005/0084758 A1 | 4/2005 | Yamamoto et al. |

FOREIGN PATENT DOCUMENTS

| | |
|---|---|
| JP 10-302770 | 11/1998 |
| JP 2004-14341 | 1/2004 |
| JP 2001-297757 | 10/2001 |
| JP 10-199524 | 7/1998 |
| JP 2004-288525 | 10/2004 |
| JP 2004-288564 | 10/2004 |
| JP 2002-237294 | 8/2002 |
| EP 1039568 | 9/2000 |

OTHER PUBLICATIONS

International Preliminary Report on Patentability for International Application No. PCT/US2007/023978, date of mailing, May 28, 2009.
Chinese Office Action dated March 7, 2011 for Chinese Patent Application No. 200780046722.9.
Notice of Preliminary Rejection for Korean Patent Application No. 10-2009-7102510, dated May 17, 2012. --

Signed and Sealed this
Sixteenth Day of October, 2012

David J. Kappos
*Director of the United States Patent and Trademark Office*